(12) United States Patent
Uchimura

(10) Patent No.: US 10,997,378 B2
(45) Date of Patent: May 4, 2021

(54) TAG MANAGEMENT DEVICE, TAG MANAGEMENT METHOD, AND PROGRAM

(71) Applicant: NEC CORPORATION, Tokyo (JP)

(72) Inventor: Jun Uchimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 280 days.

(21) Appl. No.: 16/083,986

(22) PCT Filed: Mar. 16, 2017

(86) PCT No.: PCT/JP2017/010643
§ 371 (c)(1),
(2) Date: Sep. 11, 2018

(87) PCT Pub. No.: WO2017/159781
PCT Pub. Date: Sep. 21, 2017

(65) Prior Publication Data
US 2020/0293728 A1    Sep. 17, 2020

(30) Foreign Application Priority Data
Mar. 18, 2016    (JP) .............................. JP2016-054937

(51) Int. Cl.
G06K 7/08    (2006.01)
G06K 7/10    (2006.01)

(52) U.S. Cl.
CPC ................................. *G06K 7/10297* (2013.01)

(58) Field of Classification Search
CPC .............................. G06K 7/10; G06K 7/10297
See application file for complete search history.

(56) References Cited

U.S. PATENT DOCUMENTS

| | | | |
|---|---|---|---|
| 2005/0092825 A1 | 5/2005 | Cox, Jr. et al. | |
| 2005/0248455 A1* | 11/2005 | Pope | G01K 1/024 340/539.27 |
| 2010/0254241 A1 | 10/2010 | Aoki | |
| 2010/0315205 A1* | 12/2010 | Egbert | G06K 19/07749 340/10.51 |
| 2011/0077941 A1* | 3/2011 | Dey | H04M 7/0024 704/235 |
| 2011/0309911 A1 | 12/2011 | Kemper et al. | |

(Continued)

FOREIGN PATENT DOCUMENTS

| | | |
|---|---|---|
| EP | 2 290 586 A1 | 3/2011 |
| JP | 2006-040185 A | 2/2006 |

(Continued)

OTHER PUBLICATIONS

Communication dated May 28, 2019, issued by the Japanese Patent Office in counterpart Japanese application No. 2016-054937.

(Continued)

*Primary Examiner* — Thien M Le

(57) ABSTRACT

A tag management device includes: a signal detection unit that detects a signal which is transmitted from a first tag and which includes data stored in the first tag, and detects a signal which is transmitted from a second tag and which includes data stored in the second tag, the second tag being different from the first tag; and a write unit that writes, in the second tag, data based on the data stored in the first tag.

9 Claims, 2 Drawing Sheets

(56) References Cited

U.S. PATENT DOCUMENTS

| | | | | |
|---|---|---|---|---|
| 2013/0019056 | A1* | 1/2013 | Wang | G06F 12/0246 |
| | | | | 711/103 |
| 2014/0067661 | A1* | 3/2014 | Elischer | G06Q 20/40145 |
| | | | | 705/39 |
| 2015/0106746 | A1* | 4/2015 | Vojak | G06F 3/0488 |
| | | | | 715/753 |
| 2015/0311957 | A1* | 10/2015 | Dube | H04B 5/0031 |
| | | | | 455/41.1 |
| 2016/0189089 | A1* | 6/2016 | Iyer | G06Q 10/087 |
| | | | | 705/28 |
| 2018/0253922 | A1* | 9/2018 | Yorkston | G06Q 20/341 |

FOREIGN PATENT DOCUMENTS

| | | |
|---|---|---|
| JP | 2006-126900 A | 5/2006 |
| JP | 2006-211039 A | 8/2006 |
| JP | 2006-256857 A | 9/2006 |
| JP | 2006-331106 A | 12/2006 |
| JP | 2007-334703 A | 12/2007 |
| JP | 2008-097584 A | 4/2008 |
| JP | 2009-259271 A | 11/2009 |
| JP | 2011-257807 A | 12/2011 |
| JP | 2013-228909 A | 11/2013 |
| JP | 2014-85690 A | 5/2014 |
| WO | 2009/145007 A1 | 12/2009 |

OTHER PUBLICATIONS

Communication dated Sep. 27, 2019, issued by the Intellectual Property Office of Singapore in corresponding Singapore Application No. 11201807203P.

Kato Kazuki et al., "RFID multi-reader writer compatible with multiple frequencies and tag protocols", NEC Technical Report, 2009, pp. 72-75, vol. 62 No. 4.

International Search Report for PCT/JP2017/010643, dated Apr. 18, 2017.

* cited by examiner

TAG MANAGEMENT DEVICE, TAG MANAGEMENT METHOD, AND PROGRAM

CROSS REFERENCE TO RELATED APPLICATIONS

This Application is a National Stage of International Application No. PCT/JP2017/010643 filed Mar. 16, 2017, claiming priority based on Japanese Patent Application No. 2016-054937 filed Mar. 18, 2016, the disclosure of which is incorporated herein in its entirety by reference.

TECHNICAL FIELD

The present invention relates to a tag management device, a tag management method, and a program.

BACKGROUND ART

In recent years, techniques for writing information by RFID (radio frequency identifier) technology into a RFID tag by a reader/writer device are widely used. The frequency at which the RFID tag and the reader/writer device communicate with each other is determined to some extent. In the case where the RFID tag has already been attached to the target, then due for example to a change in the frequency band usable for the RFID, a situation may occur where it becomes necessary for the RFID tag to be exchanged for another RFID tag that transmits the ID based on the signal of the new frequency band.

Patent Documents 1 to 3 are documents related to RFID tags. Non-patent document 1 discloses a device that is capable of transmitting and receiving signals to and from RFID tags, that is compatible with different frequencies according to signals of a plurality of frequencies.

PRIOR ART DOCUMENTS

Patent Documents

[Patent Document 1] PCT International Publication No. WO 2009/145007
[Patent Document 2] Japanese Unexamined Patent Application, First Publication No. 2008-097584
[Patent Document 3] Japanese Unexamined Patent Application, First Publication No. 2007-334703

Non-Patent Documents

[Non-Patent Document 1] Kato Kazuki, and two others, "RFID multi-reader writer compatible with multiple frequencies and tag protocols", NEC Technical Report, Vol. 62 No. 4, 2009, p. 72-75

DISCLOSURE OF THE INVENTION

Problem to be Solved by the Invention

In the case of using an RFID tag that transmits an ID with a new frequency in place of an RFID tag that has been used, it is desirable to be able to easily write the information recorded in the RFID tag that has been used, to the new RFID tag.

An exemplary object of the present invention is to provide a tag management device, a tag management method, and a program that solve the above problem.

Means for Solving the Problem

A tag management device according to a first exemplary aspect of the present invention includes: a signal detection unit that detects a signal which is transmitted from a first tag and which includes data stored in the first tag, and detects a signal which is transmitted from a second tag and which includes data stored in the second tag, the second tag being different from the first tag; and a write unit that writes, in the second tag, data based on the data stored in the first tag.

A tag management method according to a second exemplary aspect of the present invention includes: detecting a signal which is transmitted from a first tag and which includes data stored in the first tag; detecting a signal which is transmitted from a second tag and which includes data stored in the second tag, the second tag being different from the first tag; and writing, in the second tag, data based on the data stored in the first tag.

Moreover, a program according to a third exemplary aspect of the present invention causes a computer to execute: detecting a signal which is transmitted from a first tag and which includes data stored in the first tag; detecting a signal which is transmitted from a second tag and which includes data stored in the second tag, the second tag being different from the first tag; and writing, in the second tag, data based on the data stored in the first tag.

Effect of the Invention

According to an exemplary embodiment of the present invention, it is possible to easily write the information recorded in the RFID tag that has been used, to the new RFID tag.

EMBODIMENTS FOR CARRYING OUT THE INVENTION

Hereinafter, a tag management device according to an exemplary embodiment of the present invention will be described with reference to the drawings.

Figure 1:
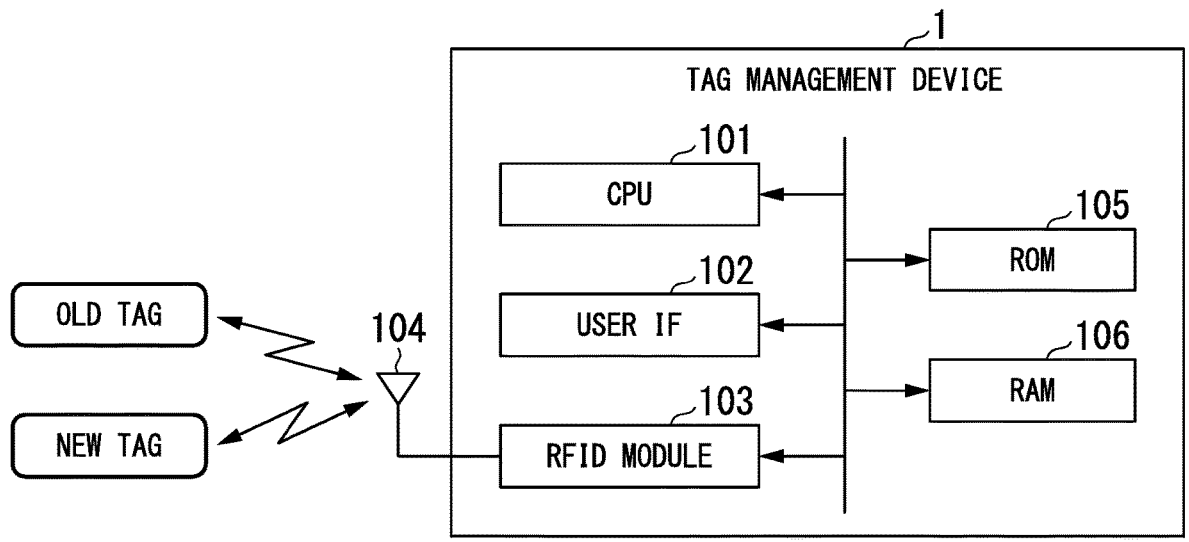
FIG. 1 is a block diagram showing a configuration of a tag management device according to an exemplary embodiment of the present invention.

FIG. 1 is a block diagram showing a configuration of a tag management device 1 according to an exemplary embodiment.

As shown in FIG. 1, the tag management device 1 includes; a CPU (Central Processing Unit) 101, a user IF (Interface) 102, an RFID module 103, an antenna 104, a ROM (Read Only Memory) 105, and a RAM (Random Access Memory) 106. The RFID module 103 has a function of wirelessly transmitting and receiving signals of different frequencies to and from an RFID tag. In the example shown in FIG. 1, there is shown a state where only one RFID module 103 and one antenna 104 are provided in one tag device 1. However, it is not limited to such a configuration. The tag device 1 may have one pair of the RFID module 103 and the antenna 104 for each different frequency (frequency band). The RFID module 103 may be able to read signals from multiple RFID tags at the same frequency or different frequencies. The user IF is connected to, for example, a touch panel, a button, or the like provided in the tag management device 1. The tag management device 1 may be a small device so that it can be carried a user.

Figure 2:
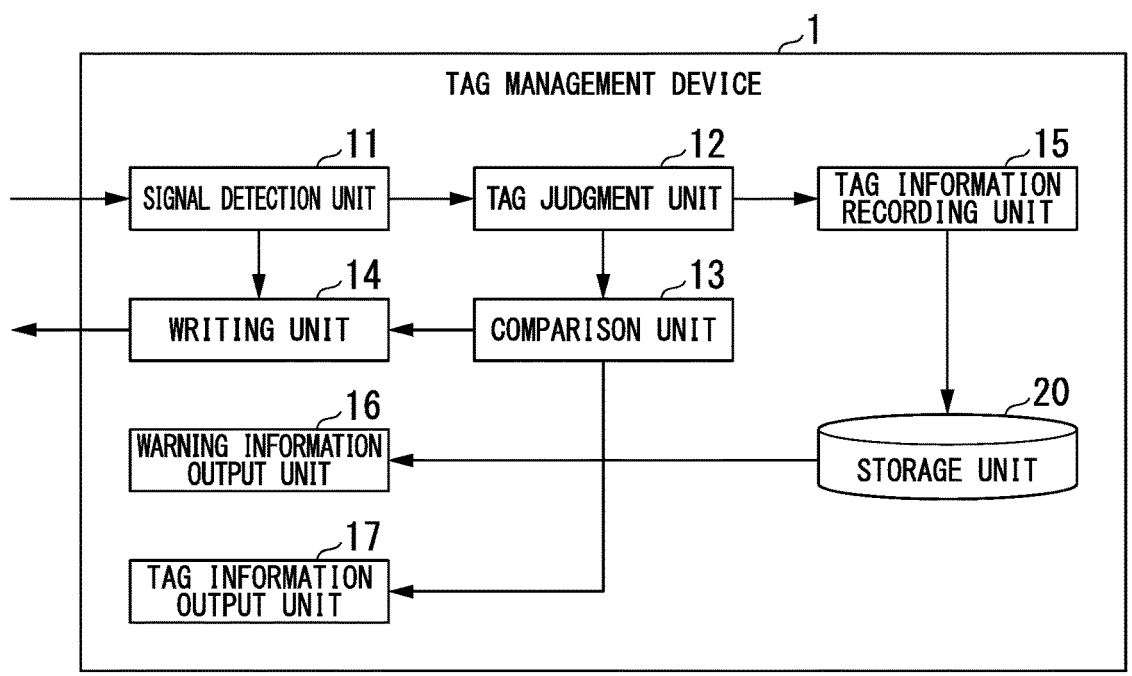
FIG. 2 is a functional block diagram of a tag management device according to an exemplary embodiment of the present invention.

FIG. 2 is a functional block diagram of the tag management device 1.

As shown in FIG. 2, the tag management device 1 includes functions such; as a signal detection unit 11, a tag judgment unit 12, a comparison unit 13, a writing unit 14, a tag information recording unit 15, a warning information output unit 16, and a tag information output unit 17. These functions can be executed by the tag management device 1, by reading a tag management program from the ROM 105 or the like and executing it by the CPU 101 of the tag management device 1.

The signal detection unit 11 detects signals transmitted from a plurality of different RFID tags.

The tag judgment unit 12 judges whether the judgement subject tag is the RFID tag of the data reading source or the RFID tag of the data writing destination.

The comparison unit 13 compares the data acquired from the RFID tag of the data reading source with the data acquired from the RFID tag of the data writing destination.

The writing unit 14 writes the data recorded in the RFID tag of the data reading source which is one of the two different RFID tags, to the RFID tag of the data writing destination which is the other tag. The writing unit 14 may replace the data recorded in a certain RFID tag with the data stored in another RFID tag.

The tag information recording unit 15 records the data acquired from the RFID tag of the data reading source in the storage unit 20.

The warning information output unit 16 stores data recorded in a plurality of RFID tags of the data reading source. The warning information output unit 16 compares the stored data with the newly acquired data recorded in the RFID tag of the data reading source for which data was newly acquired. The warning information output unit 16 outputs warning information when it is determined that the stored data matches the newly acquired data. The warning information may be information indicating that writing of data of the RFID tag of the data reading source to the RFID tag of the data reading source has already been completed.

The tag information output unit 17 displays the data acquired from the RFID tag of the reading source and the data acquired from the RFID tag of the writing destination on a monitor or the like provided in the tag management device 1, via the user IF 102. When the tag information output unit 17 includes a monitor such as a liquid crystal display or the like, the tag information output unit 17 may display the data.

The above-mentioned RFID tag of the data reading source has already recorded data to be written to the RFID tag of the data writing destination, and it is the RFID tag of that data reading source. It is possible to read data not only from the RFID tag of the data reading source, but also from the RFID tag of the data writing destination. For this reason, data for writing the RFID tag of the data reading source to the RFID tag of the data writing destination has already been recorded, and it is defined as the RFID tag of that data reading source. Hereinafter, the RFID tag of the data reading source is referred to as an old tag, and the RFID tag of the data writing destination is referred to as a new tag.

The old tag has already been attached to, for example, a container. In the old tag, information for identifying the container has already been recorded. The information already recorded in the old tag may be for example, a tag ID for identifying the container, position information for the position of the container, the manufacturing number of the old tag, and the like. The administrator attaches to the container a new tag that can read information at the new frequency. That is, the frequency used for exchanging information with the new tag is different from the frequency used for exchanging information with the old tag. In the new tag, the same information as the information recorded in the old tag is recorded. In the new tag, information obtained by converting the information recorded in the old tag based on the information may be recorded. For example, when the information recorded in the old tag is a three-digit tag ID (for example, "123"), the 3-digit tag ID is converted to a 5-digit tag ID (for example, "00123"), and that 5-digit identification number may be written in the new tag. In the present exemplary embodiment, it is possible to reduce the administrator's effort when recording the information recorded in the old tag and the conversion information based on the information, in the new tag.

Figure 3:
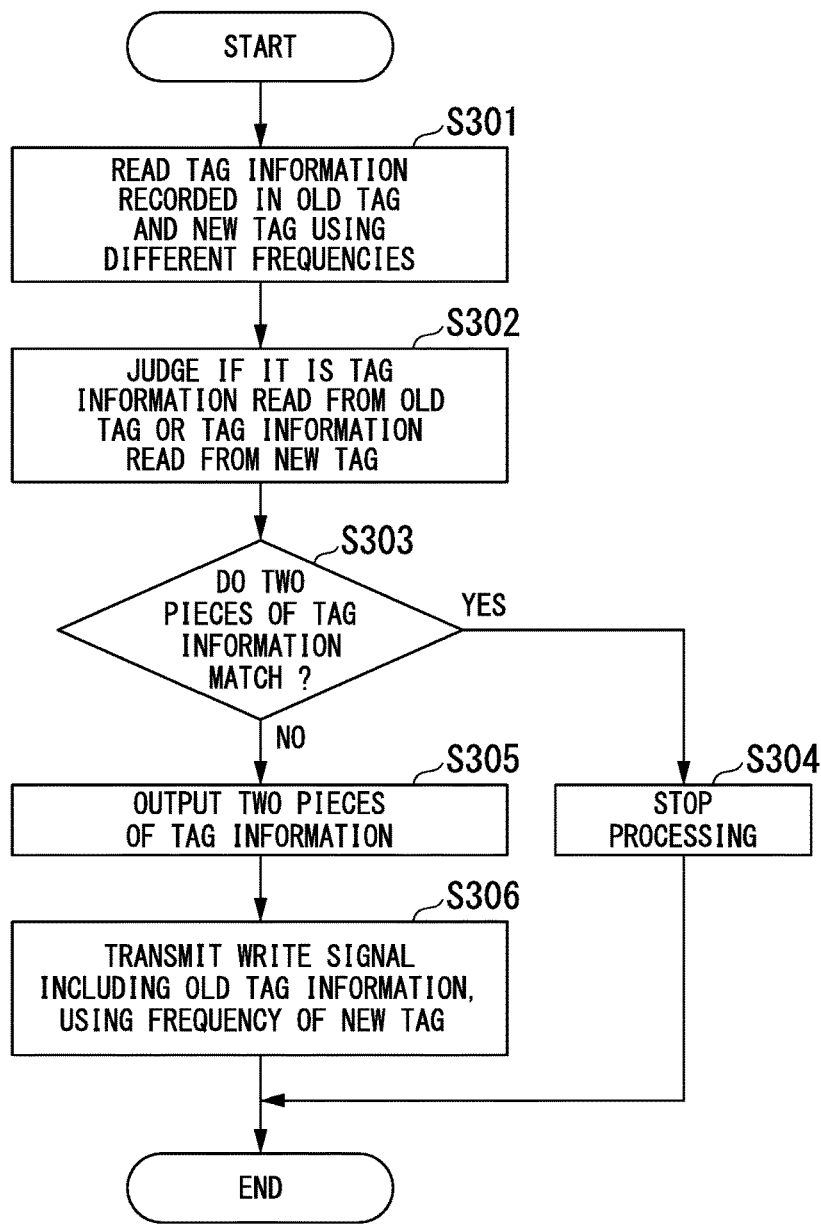
FIG. 3 is a diagram showing a processing flow of a tag management device according to an exemplary embodiment of the present invention.

FIG. 3 is a diagram showing a processing flow of the tag management device 1.

Next, the processing of the tag management device 1 will be described in sequence.

A case where an old tag (an example of a first tag) is already attached to a container will be described. In this case, the administrator attaches a new tag (an example of a second tag) adjacent to the old tag of the container of the old tag. For example, in a container yard in which many containers are installed, new tags are attached to all necessary containers among containers already attached with old tags. After that, the manager brings the tag management device 1 close to the new tag and the old tag of a certain container, and instructs the start of reading. As an instruction to start reading, for example, the administrator presses a reading start button displayed on a touch panel. An instruction to start reading is detected by the RFID module 103. Upon acquiring the instruction to start reading, the RFID module 103 reads the tag information recorded in the old tag and the new tag using different frequencies (step S301).

A case will be described where the RFID module 103 transmits a signal including the tag information in response to the reception of the signal of the frequency A by the old tag, and transmits a signal including the tag information in response to the reception of the signal of the frequency B by the new tag. In this case, the RFID module 103 may transmit the reading signal of the frequency A, and the reading signal of the frequency B in sequence. In the RFID module 103, the RFID module 103 may transmit the reading signal of the frequency A, and the reading signal of the frequency B at the same time. The RFID module 103 may retain the capability of simultaneously acquiring signals of frequencies A and B different from each other, that is, a signal transmitted at the frequency A and a signal transmitted at the frequency B. Alternatively, each tag may transmit a signal using an algorithm that prevents collisions of signals to be transmitted, so that signals of frequency A and signals of frequency B are sequentially transmitted from each tag. The old tag and the new tag may transmit the tag information signal corresponding to the reading signal of the same frequency. Each tag in this case may emit a signal using an algorithm that prevents collisions of signals to be transmitted.

The tag detection unit 11 acquires the two pieces of tag information of the old tag and the new tag acquired by the RFID module 103. If the two pieces of tag information can not be acquired at this point, the signal detection unit 11 judges that one or both of the old tag and the new tag is abnormal, and the tag information output unit 17 may output information indicating that one or both of the old tag and the new tag is abnormal. The signal detection unit 11 outputs the two pieces of tag information to the tag judgment unit 12. The tag judgment unit 12 identifies the frequency of the signal transmitted by each tag at the timing when the tag information is acquired. The tag judgment unit 12 judges whether the acquired tag information is tag information read from the old tag or tag information read from the new tag, depending on the frequency difference at the time of acquiring the tag information (step S302). The tag judgment unit 12 outputs the tag information and the tag identification information indicating whether the tag information is the information of the old tag or the information of the new tag, to the comparison unit 13. Further, the tag judgment unit 12 outputs the information of the old tag to the tag information recording unit 15. The tag information recording unit 15 records the tag information of the old tag in the storage unit 20.

The tag judgment unit 12 may judge whether the tag information is tag information acquired from the new tag or tag information acquired from the old tag, based on the difference in timing (time, the same applies hereinafter) at which the tag information was acquired. As a specific example, a case where the timing at which the RFID module 103 transmits the signal of the frequency A and the signal of the frequency B after the reading start instruction, is determined in advance will be described. In this case, based on the timing at which each tag information is received, the tag judgment unit 12 may judge whether the received tag information is tag information transmitted from the old tag or tag information transmitted from the new tag.

The tag judgment unit 12 may judge whether the acquired tag information is tag information acquired from the old tag or tag information acquired from the new tag, based on the data content of the tag information. For example, the tag judgment unit 12 may judge that the tag information in which the information is stored in a predetermined range of the tag information is the tag information of the old tag. The tag judgment unit 12 may judge that the tag information in which the information is not stored in the predetermined range is the tag information of the new tag. The tag judgment unit 12 may judge whether the acquired tag information is tag information of a new tag or tag information of an old tag, based on the tag information system.

The tag judgment unit 12 may acquire the electric field strength of a signal received by the RFID module 103, and judge whether the acquired tag information is tag information acquired from the old tag or tag information acquired from the new tag, based on the electric field strength. For example, a case is supposed where the electric field strength of the signal transmitted from the old tag differs from the electric field strength of the signal transmitted from the new tag, due to the signal transmission characteristics of the old tag and the new tag. In addition, due to the attachment position of the tag to the container, the electric field strength of the signal transmitted by each tag may be different. In this case, for example, the old tag may be attached in advance to an upper part in the container arrangement state, and the new tag may be attached to a lower part.

Based on the transmission position of the signal specified based on the signal received by the RFID module 103, the tag judgment unit 12 may judge whether the acquired tag information is tag information acquired from the old tag or tag information acquired from the new tag. In this case, the tag judgment unit 12 may have a function of specifying the signal transmission position.

The comparison unit 13 compares the two pieces of tag information and judges whether or not they match (step S303). When the two pieces of tag information match, it is determined that the tag information of the old tag has already been written in the new tag. Therefore, the comparison unit 13 stops the processing (step S304). When the two pieces of tag information do not match, the comparison unit 13 determines that the information of the old tag has not been written in the new tag. For example, when the tag information of the new tag is in the initial state, the comparison unit 13 determines that the comparison result does not match. The comparison unit 13 outputs the information of the old tag to the writing unit 14.

The comparison unit 13 may output the tag information of two tags, that is, the old tag and the new tag, to the tag information output unit 17 (step S305). In this case, the tag information output unit 17 may display the two pieces of tag information on a touch panel. When the tag information output unit 17 includes a touch panel, the tag information output unit 17 may display the two pieces of tag information. The administrator may instruct to write the tag information of the old tag to the new tag after confirming the tag information.

The writing unit 14 transmits a write signal including the information of the old tag, by using the frequency of the new tag (step S306). In this way, the new tag writes the tag information of the old tag in the storage section of its own tag, based on the write signal. When the signals used in the new tag and the old tag have the same frequency, information of the same old tag may be written in both the new tag and the old tag by means of the write signal. The tag judgment unit 12 may determine that the new tag includes invalid tag information. In this case, the writing unit 14 may overwrite the tag information of the old tag on the tag information of the new tag.

The writing unit 14 instructs the RFID module 103 to write the tag information of the old tag in the new tag, and then acquire the information recorded in the new tag. The RFID module 103 acquires the tag information from the new tag and outputs the tag information directly to the writing unit 14. The writing unit 14 compares the written tag information with the contents of the tag information acquired from the new tag after writing the tag information, and confirms the identity. That is, the writing unit 14 judges whether the written tag information and the tag information subsequently read from the new tag match. When they match, the writing unit 14 determines that the tag information of the old tag can be correctly written, and the processing is terminated. Information indicating whether identity could be confirmed may be displayed on the touch panel or the like.

The writing unit 14 may convert the tag information of the old tag into new tag information, and write the converted tag information to the new tag, when writing the data to the old tag. In this case, the writing unit 14 generates new tag information by, for example, adding new information to the tag information of the old tag, and writes the generated tag information in the new tag.

Before the writing unit 14 writes the tag information of the old tag to the new tag, the warning information output unit 16 may judge if there is a problem in the tag information. The warning information output unit 16 may output the warning information when the tag information of the old tag has a problem. For example, the comparison unit 13 outputs the tag information of the old tag to the warning information output 16, after comparing the two pieces of tag information. The warning information output unit 16 reads the tag information previously recorded in the storage unit 20 by the tag information recording unit 15, from the storage unit 20. Then the warning information output unit 16 compares the pieces of tag information and outputs warning information to a liquid crystal monitor or the like in the case of coincidence, and instructs the writing unit 14 to stop writing. According to this process, it is determined that the tag information acquired from the old tag attached to the container in the past matches the tag information acquired from the old tag of the new different container. All the tag information included in the old tag of each container needs to be different. Therefore, when tag information matches, it means that the same tag information is included in each old tag of different containers. Therefore, in such a case, the warning information output unit 16 outputs warning information. The warning information may include the location information of the container specified from the tag information, the identification number of the container, and the like.

Figure 4:
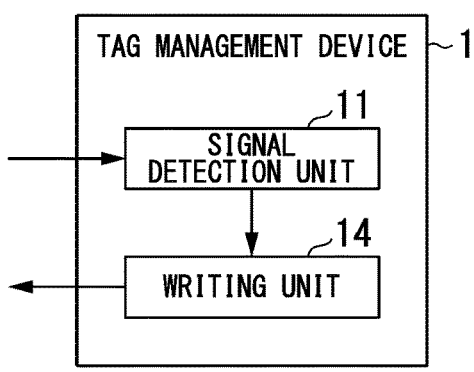
FIG. 4 is a diagram showing another configuration of a tag management device according to an exemplary embodiment of the present invention.

FIG. 4 is a diagram showing another configuration of the tag management device 1.

As shown in FIG. 4, the tag management device 1 includes at least a signal detection unit 11 that detects signals transmitted from different RFID tags, and a writing unit 14 that writes the data recorded in the RFID tag of the data reading source of one of the different RFIDs into the other RFID tag of the data writing destination.

The tag management device 1 described above has a computer system therein. The steps of the processes described above are stored in a computer-readable recording medium in the form of a program, and the above processes are performed by the computer reading and executing this program. Here, the computer-readable recording medium means a magnetic disk, a magneto-optical disk, a CD-ROM, a DVD-ROM, a semiconductor memory, or the like. Alternatively, the computer program may be delivered to a computer via a communication line, and the computer that receives the delivery may execute the program.

Further, the above program may be for realizing part of the above-described functions.

Furthermore, the above program may be a so-called difference file (difference program) which can realize the above-described functions by a combination with a program already recorded in the computer system.

Some or all of the above exemplary embodiments may also be described as follows, but are not limited to the following.

(Supplementary Note 1)

A tag management device comprising:

a signal detection unit that detects a signal which is transmitted from a first tag and which includes data stored in the first tag, and detects a signal which is transmitted from a second tag and which includes data stored in the second tag, the second tag being different from the first tag; and a write unit that writes, in the second tag, data based on the data stored in the first tag.

(Supplementary Note 2)

The tag management device according to supplementary note 1, wherein the signal transmitted from the first tag is a signal of a first frequency, the signal transmitted from the second tag is a signal of a second frequency that is different from the first frequency, and the signal detection unit detects the signal of the first frequency that is transmitted from the first tag, and detects the signal of the second frequency that is transmitted from the second tag.

(Supplementary Note 3)

The tag management device according to supplementary note 1 or 2, further comprising:

a tag information output unit that displays at least one of the data stored in the first tag and the data stored in the second tag.

(Supplementary Note 4)

The tag management device according to any one of supplementary notes 1 to 3, further comprising:

a warning information output unit that determines whether data included in a signal newly transmitted from the second tag matches the data stored in the first tag, the warning information output unit outputting warning information in case where the warning information output unit determines that the data included in the signal newly transmitted from the second tag matches the data stored in the first tag.

(Supplementary Note 5)

The tag management device according to any one of supplementary notes 1 to 4, wherein the writing unit converts the data stored in the first tag, and writes the converted data in the second tag.

(Supplementary Note 6)

The tag management device according to any one of supplementary notes 1 to 5, further comprising:

a tag judgment unit that judges whether a judgement target tag is a tag of a data reading source or a tag of a data writing destination.

(Supplementary Note 7)

The tag management device according to supplementary note 6, wherein the tag judgment unit judges whether the judgement subject tag is a tag of a data reading source or a tag of a data writing destination, based on a frequency of a signal transmitted from the judgement subject tag.

(Supplementary Note 8)

The tag management device according to supplementary note 6, wherein the tag judgment unit judges whether the judgement subject tag is a tag of a data reading source or a tag of a data writing destination, based on a content of data included in a signal transmitted from the judgement subject tag.

(Supplementary Note 9)

The tag management device according to supplementary note 6, wherein the tag judgment unit judges whether the judgement subject tag is a tag of a data reading source or a tag of a data writing destination, based on an electric field strength of a signal transmitted from the judgement subject tag.

(Supplementary Note 10)

The tag management device according to supplementary note 6, wherein the tag judgment unit identifies a transmission position of a signal transmitted from the judgement subject tag, based on the signal transmitted from the judgement subject tag, and the tag judgement unit determines whether the judgement subject tag is a tag of a data reading source or a tag of a data writing destination, based on the transmission position of the signal.

(Supplementary Note 11)

The tag management device according to any one of supplementary notes 6 to 10, wherein the first tag is a tag that is judged to be a tag of a data reading source by the tag judgment unit, and the second tag is a tag that is judged to be a tag of a data writing destination by the tag judgment unit.

(Supplementary Note 12)

The tag management device according to any one of supplementary notes 1 to 11, wherein the writing unit writes, in the second tag, the data stored in the first tag, and then determines whether data stored in the second tag matches the data stored in the first tag.

(Supplementary Note 13)

The tag management device according to any one of supplementary notes 1 to 12, wherein the data based on the data stored in the first tag is the same data as the data stored in the first tag, or is data generated based on the data stored in the first tag.

(Supplementary Note 14)

The tag management device according to any one of supplementary notes 1 to 13, wherein the first tag and the second tag are RFID tags.

(Supplementary Note 15)

The tag management device according to supplementary note 1, further comprising:

a tag judgment unit that judges whether a signal detected by the signal detection unit is a signal transmitted from a tag of a data reading source, or a signal transmitted from a tag of a data writing destination, wherein the writing unit writes data based on data included in a signal judged to be a signal transmitted from a tag of a data reading source, in a tag that has transmitted a signal judged to be a tag of a data writing destination by the signal detection unit.

(Supplementary Note 16)

A tag management method comprising:

detecting a signal which is transmitted from a first tag and which includes data stored in the first tag;

detecting a signal which is transmitted from a second tag and which includes data stored in the second tag, the second tag being different from the first tag; and writing, in the second tag, data based on the data stored in the first tag.

(Supplementary Note 17)

A program which causes a computer to execute:

detecting a signal which is transmitted from a first tag and which includes data stored in the first tag;

detecting a signal which is transmitted from a second tag and which includes data stored in the second tag, the second tag being different from the first tag; and writing, in the second tag, data based on the data stored in the first tag.

This application is based upon and claims the benefit of priority from Japanese Patent Application No. 2016-054937, filed Mar. 18, 2016, the disclosure of which is incorporated herein in its entirety by reference.

INDUSTRIAL APPLICABILITY

The present invention may be applied to a tag management device, a tag management method, and a program.

REFERENCE SYMBOLS

1 Tag management device
11 Signal detection unit
12 Tag judgment unit
13 Comparison unit
14 Writing unit
15 Tag information recording unit
16 Warning information output unit
17 Tag information output unit
20 Storage unit (ROM, RAM)
101 CPU
102 User IF
103 RFID module
104 Antenna
105 ROM
106 RAM

The invention claimed is:

1. A tag management device comprising:

a signal detection unit that detects a signal which is transmitted from a first tag and which includes data stored in the first tag, and detects a signal which is transmitted from a second tag and which includes data stored in the second tag, the second tag being different from the first tag, the first tag being a tag of a data reading source, the second tag being a tag of a data writing destination, the signal transmitted from the first tag being a signal of a first frequency, the signal transmitted from the second tag being a signal of a second frequency that is different from the first frequency;

a write unit that writes, in the second tag, data based on the data stored in the first tag; and a tag judgment unit that judges whether a judgement subject tag is the first tag or the second tag, based on whether a frequency of a signal transmitted from the judgement subject tag is the first frequency or the second frequency.

2. The tag management device according to claim 1, further comprising:

a tag information output unit that displays at least one of the data stored in the first tag and the data stored in the second tag.

3. The tag management device according to claim 1, further comprising:

a warning information output unit that determines whether data included in a signal newly transmitted from the second tag matches the data stored in the first tag, the warning information output unit outputting warning information in case where the warning information output unit determines that the data included in the signal newly transmitted from the second tag matches the data stored in the first tag.

4. The tag management device according to claim 1, wherein the writing unit converts the data stored in the first tag, and writes the converted data in the second tag.

5. The tag management device according to claim 1, wherein the writing unit writes, in the second tag, the data stored in the first tag, and then determines whether data stored in the second tag matches the data stored in the first tag.

6. The tag management device according to claim 1, wherein the data based on the data stored in the first tag is the same data as the data stored in the first tag, or is data generated based on the data stored in the first tag.

7. The tag management device according to claim 1, wherein the first tag and the second tag are RFID tags.

8. A tag management method comprising:

detecting a signal which is transmitted from a first tag and which includes data stored in the first tag;

detecting a signal which is transmitted from a second tag and which includes data stored in the second tag, the second tag being different from the first tag, the first tag being a tag of a data reading source, the second tag being a tag of a data writing destination, the signal transmitted from the first tag being a signal of a first frequency, the signal transmitted from the second tag being a signal of a second frequency that is different from the first frequency;

writing, in the second tag, data based on the data stored in the first tag; and judging whether a judgement subject tag is the first tag or the second tag, based on whether a frequency of a signal transmitted from the judgement subject tag is the first frequency or the second frequency.

9. A non-transitory computer-readable recording medium storing a program which causes a computer to execute:

detecting a signal which is transmitted from a first tag and which includes data stored in the first tag;

detecting a signal which is transmitted from a second tag and which includes data stored in the second tag, the second tag being different from the first tag, the first tag being a tag of a data reading source, the second tag being a tag of a data writing destination, the signal transmitted from the first tag being a signal of a first frequency, the signal transmitted from the second tag being a signal of a second frequency that is different from the first frequency;

writing, in the second tag, data based on the data stored in the first tag; and judging whether a judgement subject tag is the first tag or the second tag, based on whether a frequency of a signal transmitted from the judgement subject tag is the first frequency or the second frequency.

* * * * *